(12) United States Patent
Lee et al.

(10) Patent No.: US 10,004,105 B2
(45) Date of Patent: Jun. 19, 2018

(54) METHOD FOR NETWORK SELF-HEALING IN CLUSTER-TREE STRUCTURED WIRELESS COMMUNICATION NETWORKS

(71) Applicant: Seoul National University R&DB Foundation, Seoul (KR)

(72) Inventors: Yong Hwan Lee, Seoul (KR); Jin Seok Han, Gunpo-si (KR); Jae Seok Bang, Seoul (KR); Dong Kwan Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 12 days.

(21) Appl. No.: 15/384,798

(22) Filed: Dec. 20, 2016

(65) Prior Publication Data

US 2017/0188409 A1    Jun. 29, 2017

(51) Int. Cl.
*H04W 4/00* (2018.01)
*H04W 76/02* (2009.01)
*H04L 12/44* (2006.01)
*H04W 84/20* (2009.01)

(52) U.S. Cl.
CPC .............. *H04W 76/19* (2018.02); *H04L 12/44* (2013.01); *H04W 4/005* (2013.01); *H04W 4/70* (2018.02); *H04W 76/028* (2013.01); *H04W 84/20* (2013.01)

(58) Field of Classification Search
CPC .................................................. H04W 76/028

USPC .......................................................... 370/329
See application file for complete search history.

(56) References Cited

U.S. PATENT DOCUMENTS

| 2004/0103282 A1* | 5/2004 | Meier | G06Q 20/3674 |
| | | | 713/171 |
| 2009/0161637 A1* | 6/2009 | Ruy | H04W 72/02 |
| | | | 370/336 |
| 2013/0300941 A1* | 11/2013 | Kafle | H04L 27/0006 |
| | | | 348/725 |
| 2013/0316652 A1* | 11/2013 | Wang | H04W 48/06 |
| | | | 455/41.2 |
| 2015/0138977 A1* | 5/2015 | Dacosta | H04W 28/021 |
| | | | 370/235 |

* cited by examiner

*Primary Examiner* — Shripal Khajuria
(74) *Attorney, Agent, or Firm* — The Webb Law Firm (57) ABSTRACT

Provided is a network self-healing method in which, when a link between a parent device and a child device breaks down in a wireless communication network of a cluster-tree structure in which a main communication device (referred to an access point (AP)) manages network operation, routers that are devices capable of having their child devices, and end devices that are devices incapable of having their child devices are associated with each other in a parent-child device relationship, the link is restored. When a router becomes an orphan device, the router makes network re-association in a cluster unit while maintaining synchronized operation with its child devices, and thus time, energy and signaling burden for network self-healing is largely reduced.

7 Claims, 7 Drawing Sheets

METHOD FOR NETWORK SELF-HEALING IN CLUSTER-TREE STRUCTURED WIRELESS COMMUNICATION NETWORKS

CROSS-REFERENCE TO RELATED APPLICATION

This application claims priority to Korean Patent Application No. 10-2015-0185989, filed Dec. 24, 2015, the disclosure of which is hereby incorporated in its entirety by reference.

BACKGROUND OF THE INVENTION

Rapid development of wireless communications has constantly affected habits and behavior patterns of people, and recently, Internet of Things (IoT) service technologies connecting persons and wireless devices anywhere and anytime have been under development. A wireless sensor network (WSN) provides and maintains connectivity among devices and persons, as a core technology for deploying IoT services. However, since devices in a WSN operate in limited computing capability and battery condition, the WSN is frequently damaged due to the change of channel condition, interference, malfunction, and power depletion. In order to deploy a WSN system, devices in the WSN need to be recovered from networking damage through efficient network self-healing.

A cluster-tree structure provides ease of network controllability since a network may be divided in terms of network layer and cluster unit, where a main communication device, referred to an access point (AP), makes network association with a plurality of devices in a parent-child device (node) relationship. A device, referred to a router, may have its child devices, and transmit and receive data to and from its child devices. A device, referred to an end device, cannot have its child devices.

ZigBee widely applied to construction of WSNs may perform network operation while reducing power consumption of devices by means of duty cycling with a super-frame structure in which a parent device synchronously operates with its child devices by periodically transmitting a beacon signal in a beacon-enabled mode, and a signal is transmitted and received during an active period and is not transmitted and received during an inactive period. When a child device does not consecutively receive a beacon signal from its parent device a certain number of times due to link damage between the child device and its parent device, the child device determines itself as an orphan device and performs following network re-association process.

A child device becoming an orphan device sequentially scans available channels to find parent candidate devices (i.e., an AP or routers) nearby, determines information on a set of parent candidate devices using a beacon signal received during the channel scanning, selects a parent candidate device as a device having the lowest network depth in the set of parent candidate devices, and requests the parent candidate device to allocate a new address, thereby re-associating the WSN.

However, since a network self-healing technique of Zig-Bee does not allow an orphan device having its child devices to make normal packet transmission with its child devices during the network re-association process, an orphan propagation phenomenon, in which the child devices of an orphan device are unable to receive a beacon signal and thus all the child devices may become orphan devices, may occur. Due to the orphan propagation phenomenon, despite link damage at one device of a network, a plurality of devices becoming orphan devices may need to perform network re-association process, which may take long time and large power consumption for the network re-association. Thus, ZigBee may not be able to efficiently handle networking damage frequently occurred in a practical environment.

BRIEF DESCRIPTION OF THE INVENTION

According to an embodiment, when a device having its child devices becomes an orphan device, the device keeps transmission and reception of packets to and from its child devices to prevent the orphan propagation during the network re-association process, and re-associates to the network in a cluster-wise mode in consideration of network depth by getting a new address allocated by a new parent candidate device through exchange of association control messages. The child devices update their address by themselves after receiving a beacon signal including the new address of their parent device, thereby reducing power consumption and signaling burden for exchange of re-association control messages in the network re-association process.

Additional aspects will be set forth in part in the description which follows and, in part, will be apparent from the description, or may be learned by practice of the presented embodiments.

According to an embodiment of the present invention, there is provided a network self-healing method in which an orphan device dis-associated from a network due to networking damage makes network re-association in a cluster-tree structured multi-hop wireless communication network, wherein a main communication device (referred to an access point (AP)) that manages network operation, routers that can have their child devices, and end devices that cannot have their child devices are associated with each other in a parent-child device relationship, and a child device keeps network synchronization with its parent device by receiving a beacon signal periodically transmitted from its parent device, the network self-healing method including: when the orphan device is a router, keeping, by the orphan device, network synchronization with its child devices by periodically transmitting a beacon signal during a network re-association procedure as before being an orphan device; determining, by the orphan device, a set of parent candidate devices and a parent candidate device in the set of parent candidate devices in consideration of network depth and received signal power; and determining, by the orphan device, child devices to make the network re-association together in consideration of a network depth of the determined parent candidate device, and making the network re-association to the determined parent candidate device with the determined child devices, and when the orphan device is an end device, determining, by the orphan device, a set of parent candidate devices and a parent candidate device in the set of parent candidate devices in consideration of received power of signal transmitted from the set of parent candidate devices, and making, by the orphan device, the network re-association to the determined parent candidate device.

The determining of a set of parent candidate devices and a parent candidate device in the set of parent candidate devices when the orphan device is a router may include: estimating, by the orphan device, network depth and received signal power of adjacent devices (i.e., an AP or routers) after receiving a beacon signal transmitted from the adjacent devices by using a conventional channel scanning method; determining, by the orphan device, a set of parent candidate devices for network re-association in consideration of network depth in an ascending order; and determining, by the orphan device, a parent candidate device as a device providing a maximum received signal power among devices having the lowest network depth in the set of parent candidate devices.

The determining of the child devices and making network re-association when the orphan device is a router may include: when $L_{max}$ denotes a maximum network depth, $L_{past}$ denotes a network depth of its previous parent device before being an orphan device, wherein $0 \le L_{past} < L_{max}$, and $L_{new}$ denotes a network depth of the determined parent candidate device, wherein $0 \le L_{new} < L_{max}$; when $L_{new} = L_{max} - 1$, transmitting, by the orphan device, a re-association control message to all its child devices, and making, by the orphan device, the network re-association as an end device; when $0 \le L_{new} < L_{max} - 1$ and $L_{new} \le L_{past}$, making, by the orphan device, the network re-association with its child devices while keeping network synchronization with its child devices; and when $0 \le L_{new} < L_{max} - 1$ and $L_{new} > L_{past}$, transmitting, by the orphan device, a re-association control message to its child routers, and making, by the orphan device, the network re-association only with its child end devices.

The making, by the orphan device, network re-association with its child devices may include: requesting, by the orphan device, the determined parent candidate device to accept its network re-association as a child router; when the determined parent candidate device has an address space available for accepting the orphan device as its child router, allocating, by the determined parent candidate device, the available address space to the orphan device and accepting a request of network re-association of the orphan device as its child router, and when the determined parent candidate device has no address space available, refusing a request of network re-association of the orphan device; after the orphan device re-associates to the determined parent candidate device, allocating, by the orphan device, addresses to its child devices by using the address space allocated by the determined parent candidate device, and when a request of network re-association of the orphan device is refused by the determined parent candidate device, removing, by the orphan device, the determined parent candidate device in the set of parent candidate devices, determining a new parent candidate device in the set of parent candidate devices, and making the network re-association with its child devices determined in consideration of network depth of the new parent candidate device when the orphan device is a router; and when a request of network re-association of the orphan device is refused by all parent candidate devices in the set of parent candidate devices, transmitting, by the orphan device, a re-association control message including a 're-association command' to all its child devices and making network re-association alone as an end device after determining a new set of parent candidate devices and a parent candidate device in the new set of parent candidate devices.

The determining of a set of parent candidate devices and a parent candidate device in the set of parent candidate devices, and the making of network re-association when the orphan device is an end device may include: estimating, by the orphan device, received power of beacon signal transmitted from adjacent parent candidate devices (e.g., an AP or routers) by using a conventional channel scanning method; determining, by the orphan device, a set of parent candidate devices for network re-association in consideration of received signal power in a descending order; determining, by the orphan device, a parent candidate device as a device providing the highest received signal power in the set of parent candidate devices; requesting, by the orphan device, a network re-association to the determined parent candidate device as a child end device; when the determined parent candidate device has an address space available for accepting the orphan device as its child end device, allocating, by the determined parent candidate device, the orphan device an address in the address space available for its child end devices and accepting a request of network re-association of the orphan device as its child end device, and when the determined parent candidate device has no address space available for its child end devices, refusing a request of network re-association of the orphan device; when a request of network re-association of the orphan device is refused by the determined parent candidate device, removing, by the orphan device, the determined parent candidate device in the set of parent candidate devices, determining a new parent candidate device as a device providing the highest received signal power in the set of parent candidate devices, and requesting a network re-association to the determined parent candidate device as a child end device; and when a request of network re-association of the orphan device is refused by all parent candidate devices in the set of parent candidate devices, requesting, by the orphan device, the network re-association after determining a new set of parent candidate devices and a parent candidate device in the new set of parent candidate devices.

The network self-healing method may further include, after the orphan device transmits a re-association control message to its child devices: when a child device that receives the re-association control message is a router, requesting, by the child device, a network re-association as a router while keeping network synchronization with its child devices, the determining of a set of parent candidate devices and a parent candidate device in the set of parent candidate devices, and the determining of the child devices that make the network re-association together; and when a child device that receives the re-association control message is an end device, requesting, by the child device, a network re-association as an end device after determining a set of parent candidate devices and a parent candidate device in the set of parent candidate devices, and making the network re-association.

The network self-healing method according to an embodiment may improve, compared to an existing technique, network self-healing performance in a cluster-tree structured wireless communication network, in which a plurality of devices are associated to an AP in a parent-child device relationship with a multi-hop structure, while reducing signaling burden and power consumption by means of network re-association in a cluster-wise manner.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinbelow, exemplary embodiments of the present invention will be described in detail with reference to the accompanying drawings. In the description of the present invention, certain detailed explanations are omitted when it is deemed that they may unnecessarily obscure the essence of the invention. All terms which are used herein should be construed as having meanings that are obvious to one of ordinary skill in the art. However, the terms may have different meanings according to an intention of one of ordinary skill in the art, precedent cases, or the appearance of new technologies. Thus, the terms used herein have to be defined based on the meaning of the terms together with the description throughout the specification.

Figure 1:
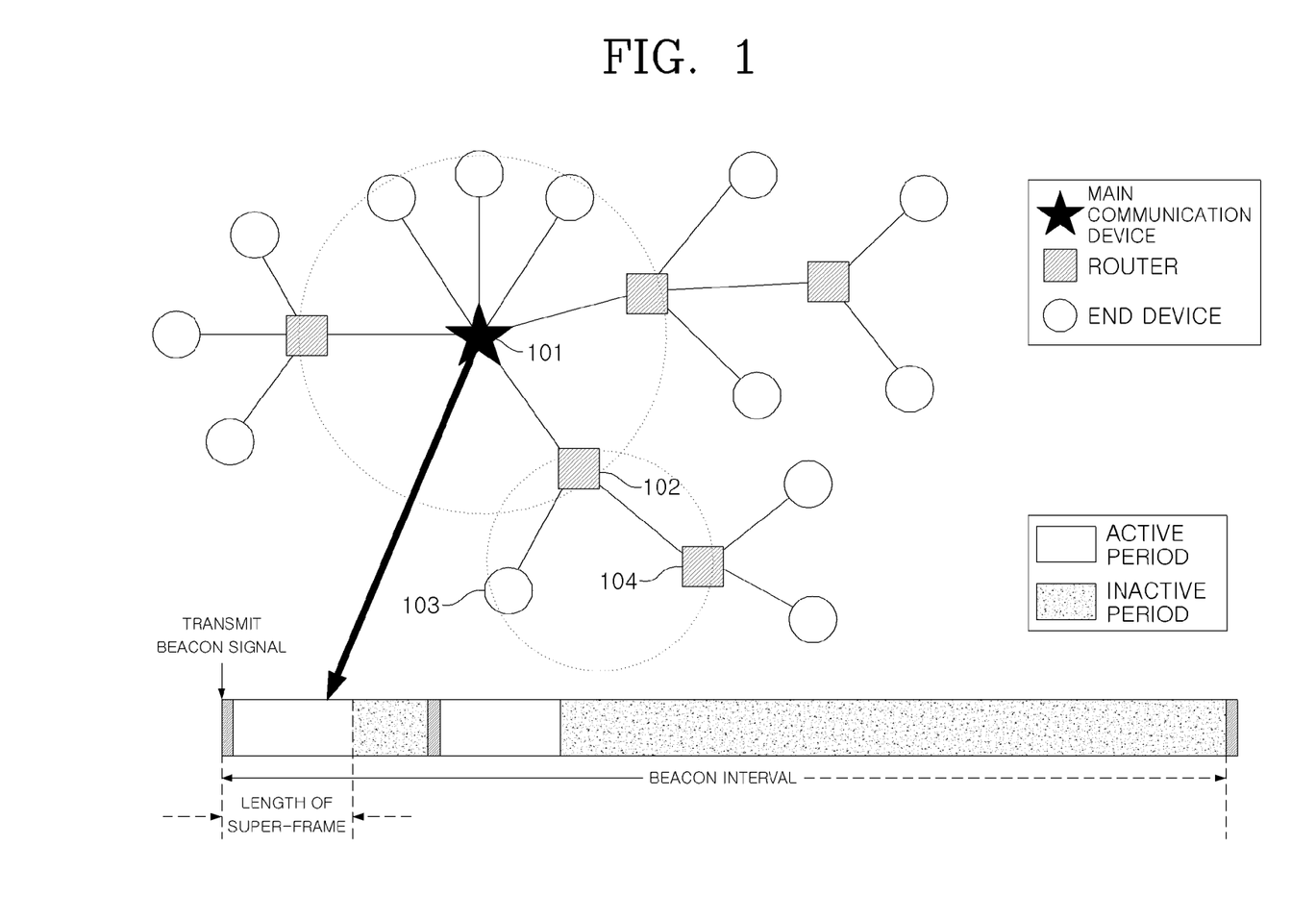
FIG. 1 illustrates an operational environment of a wireless communication network according to an embodiment of the present invention.

FIG. 1 illustrates a concept of a cluster-tree structured wireless sensor network (WSN) to which an embodiment of the present invention is applicable. In FIG. 1, an access point (AP) manages a network, routers can have their own child devices, and end devices may be associated to the AP or a router and are unable to have their own child devices. In an arbitrary pair of devices associated in one hop, a device associated to the AP in less hops than the other device is defined by a parent device and the other device is defined by a child device, wherein a network depth of the child device is larger than that of the parent device by one. Referring to a configuration of the cluster-tree structured WSN in detail with reference to FIG. 1, for example, based on a device 102 in the WSN, the device 102 is a child device with respect to a device 101 associated to the AP in less hops among devices associated to the device 102, and the device 102 is a parent device with respect to devices 103 and 104 associated to the AP in more hops.

In order to reduce power consumption of a WSN, parent-child devices use a super-frame structure wherein parent-child devices make communications only during an active period and stop transceiver operation during an inactive period as shown in FIG. 1. Such a super-frame structure is periodically repeated, wherein a parent device periodically transmits a beacon signal including network information at the beginning of each super-frame at a period of a super-frame length (equal to a beacon interval (BI)), and child devices receive a beacon signal transmitted from their parent device to keep network synchronization, and transmit and receive data to and from their parent device (for example, a beacon-enabled mode of ZigBee).

In the WSN, when N denotes the number of channels available for communications, a device making network association determines information on a set of parent candidate devices using a beacon signal received through N channels, selects a parent candidate device, and attempts to make network association to the parent candidate device which will allocate an L-bit network address for network communications. Devices may generally have their unique identifier, but they may reduce signaling burden for communications by using an address allocated in the network association. In a case of ZigBee, a router has a its own address space of $C_{skip}$ allocated by its parent device, which can be used for address allocation to its child devices as in Equation 1 below, and has Cm addresses available for network association of its child devices in a tree structure, wherein $R_m$ addresses may be available for network association of its child routers and the remaining, i.e., $(C_m-R_m)$, addresses may be available for network association of its child end devices.

[Equation 1]
$$Cskip(D) = \begin{cases} \max\{0, 1 + Cm \times (Lm - D - 1)\}, & \text{for } Rm = 1 \\ \max\left\{0, \frac{Cm \times Rm^{Lm-D-1} + Rm - Cm - 1}{Rm - 1}\right\}, & \text{otherwise} \end{cases}$$

Here, D denotes a network depth and $L_m$ denotes a maximum network depth.

Figure 2:
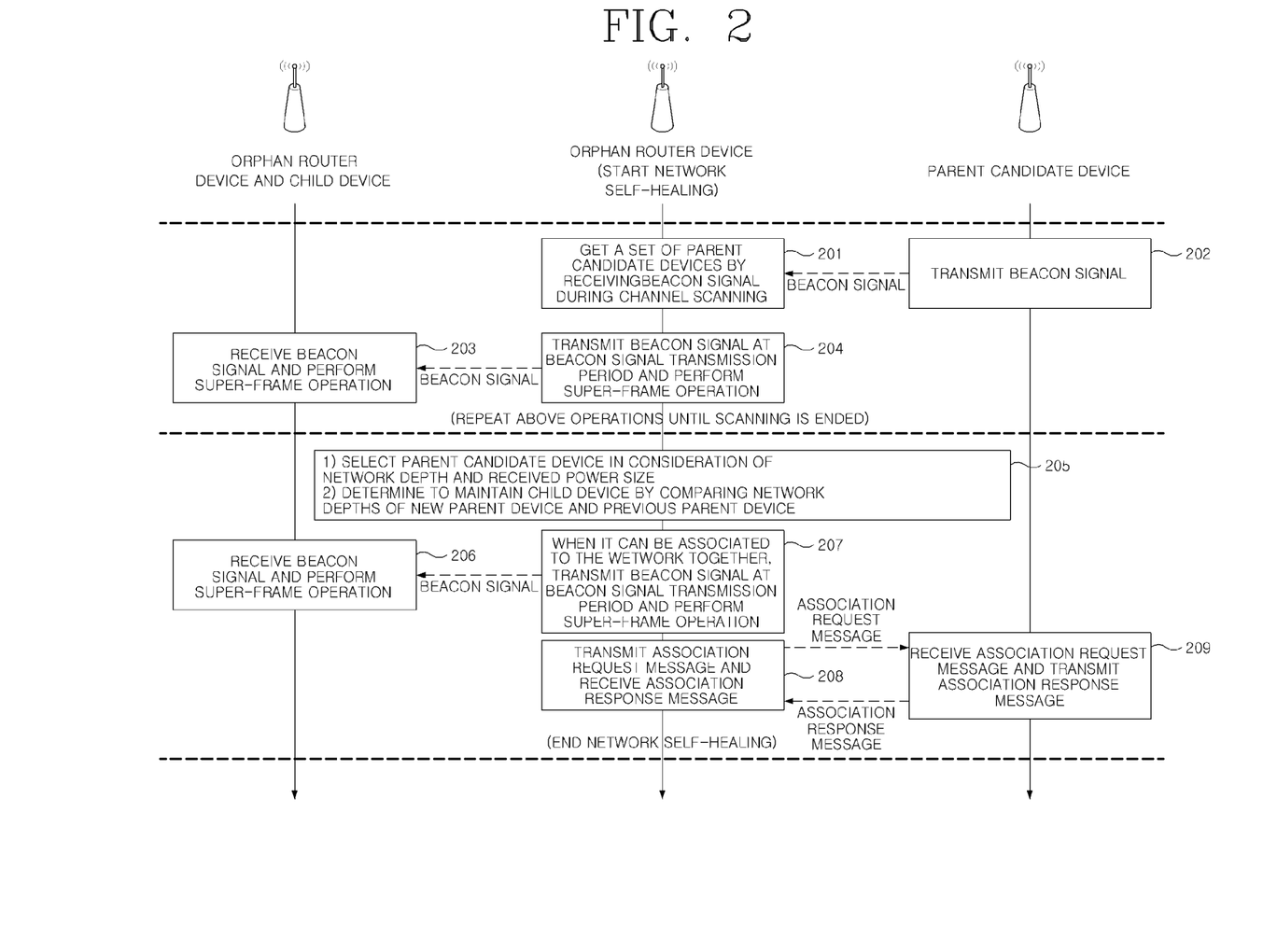
FIG. 2 illustrates network self-healing processes according to an embodiment of the present invention.

A network self-healing message protocol in an example of an orphan device having its child devices, according to an embodiment of the present invention, is shown in FIG. 2. When an orphan device has no child device, the network self-healing message protocol of FIG. 2 is performed without operation 203, 204, 2) of 205, 206, and 207. The orphan device determines information on a set of parent candidate devices in operation 201 after receiving a beacon signal transmitted from adjacent devices in operation 202, by using a conventional channel scanning method, and transmits a beacon signal at the beginning of its beacon interval to perform a super-frame based operation as a parent device, in operation 204. While the orphan device makes a network re-association, its child devices may regularly receive a beacon signal and perform packet transmission, in operation 203. After the channel scanning, the orphan device determines a parent candidate device in the set of parent candidate devices in an ascending order of network depth and a descending order of received signal power, in operation 205. When the network depth of the determined parent candidate device is not larger than that of the previous parent device of the orphan device (a condition in which all child devices can be re-associated to the network together) or when the network depth of the determined parent candidate device is enough to only keep its child end devices (a condition in which only child end devices can be re-associated to the network together), the orphan device may make network re-association in a cluster-wise manner and thus keeps network synchronization with its child devices by transmitting a beacon signal at the beginning of its own beacon interval and performs a super-frame based operation as a parent device in operation 207 as in operation 204. The orphan device that makes network re-association in a one-hop cluster mode transmits a re-association control message including a 're-association command' to its child routers in the super-frame based operation in operation 207. The orphan device exchanges association request/response messages with a parent candidate device for network re-association, in operation 208 and 209. After the orphan device receives an association response message including an 'association permission' information, the orphan device finishes the network self-healing process, and after the orphan device receives an association response message including an 'association denial' information, the orphan device repeats the network re-association operation from operation 205 until the set of parent candidate devices becomes empty. When the set of parent candidate devices is empty, the network self-healing message protocol of FIG. 2 is performed again from operation 201 without performing operation 203, 204, 2) of 205, 206, and 207.

Figure 3:
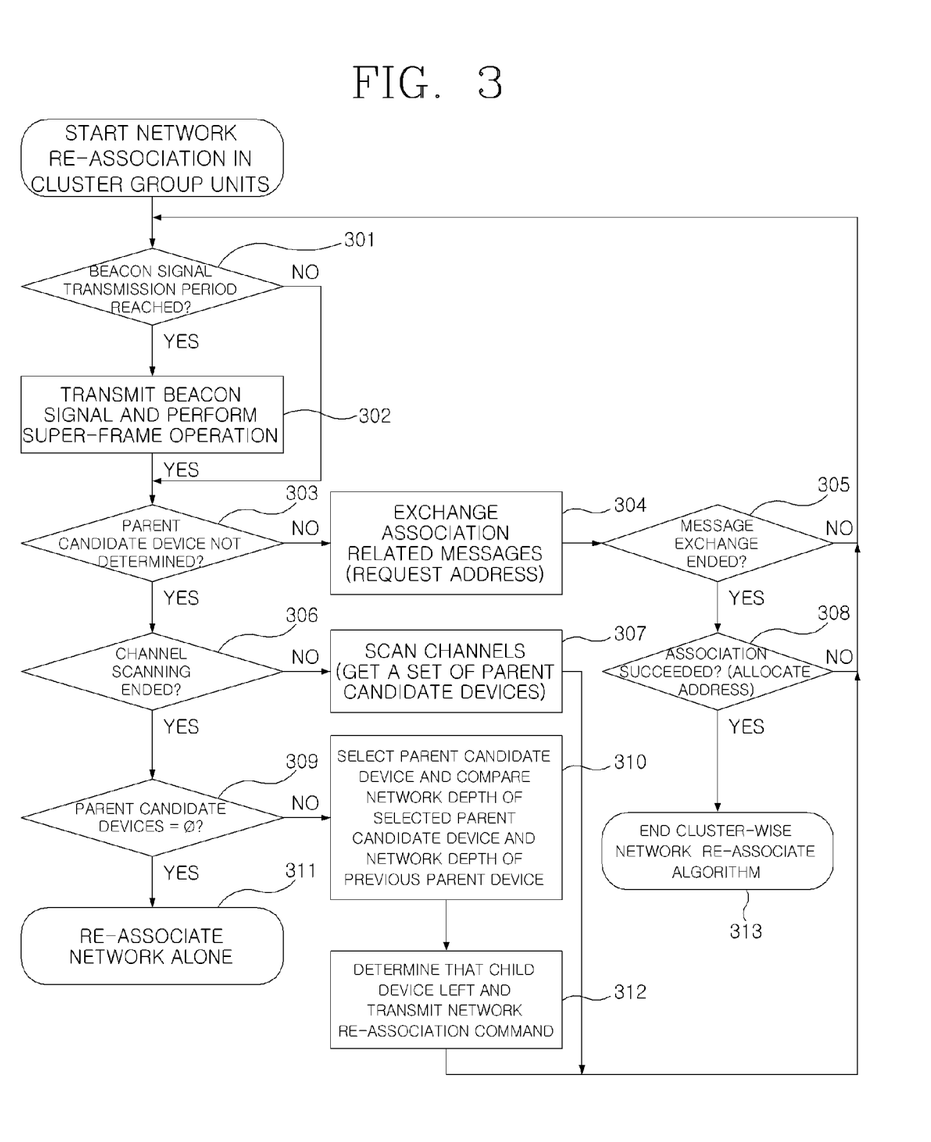
FIG. 3 illustrates a principle of cluster-wise network re-association processes according to an embodiment of the present invention.

A cluster-wise network re-association procedure performed when a device having child devices becomes an orphan device, according to an embodiment of the present invention, is shown in FIG. 3. The orphan device transmits a beacon signal and performs a super-frame based operation in operation 302 at the beginning of its own beacon interval in operation 301 even while scanning a channel, selecting a parent candidate device, or exchanging network association-related messages. When a parent candidate device is not determined in operation 303, the orphan device determines whether to continue the channel scanning in operation 306 and 307. After the orphan device performs the channel scanning in operation 306 and determines a set of parent candidate devices in operation 309, the orphan device selects a parent candidate device as a device having the lowest network depth and providing the highest received signal power in the set of parent candidate devices for network re-association, and compares the network depth of the selected parent candidate device with that of its previous parent device before being an orphan device in operation 310 to determine whether to make network re-association with its child devices together. In detail, when the network depth of the selected parent candidate device is not larger than that of its previous parent device, the orphan device keeps a current network structure with its child devices, and when the network depth of the selected parent candidate device is enough to only keep its child end devices, the orphan device transmits a re-association control message including a 're-association command' to its child routers so that its child routers is disconnected from the orphan device and only its child end devices are kept with the orphan device in operation 312. As described above, after the orphan device selects a parent candidate device in operation 303, the orphan device transmits an association request message to the selected parent candidate device to request for an address space and receives an association response message from the selected parent candidate device in operations 304 and 305. When the orphan device receives an association response message including an 'association permission' information, the orphan device gets a new address included in the association response message in operation 308, and finishes its cluster-wise network re-association process in operation 313. When the orphan device receives an association response message including an 'association denial' information, the orphan device repeats the above operations until the set of parent candidate devices becomes empty, and when the set of parent candidate devices is empty in operation 309, the orphan device re-associates to the network alone by itself in operation 311.

Figure 4:
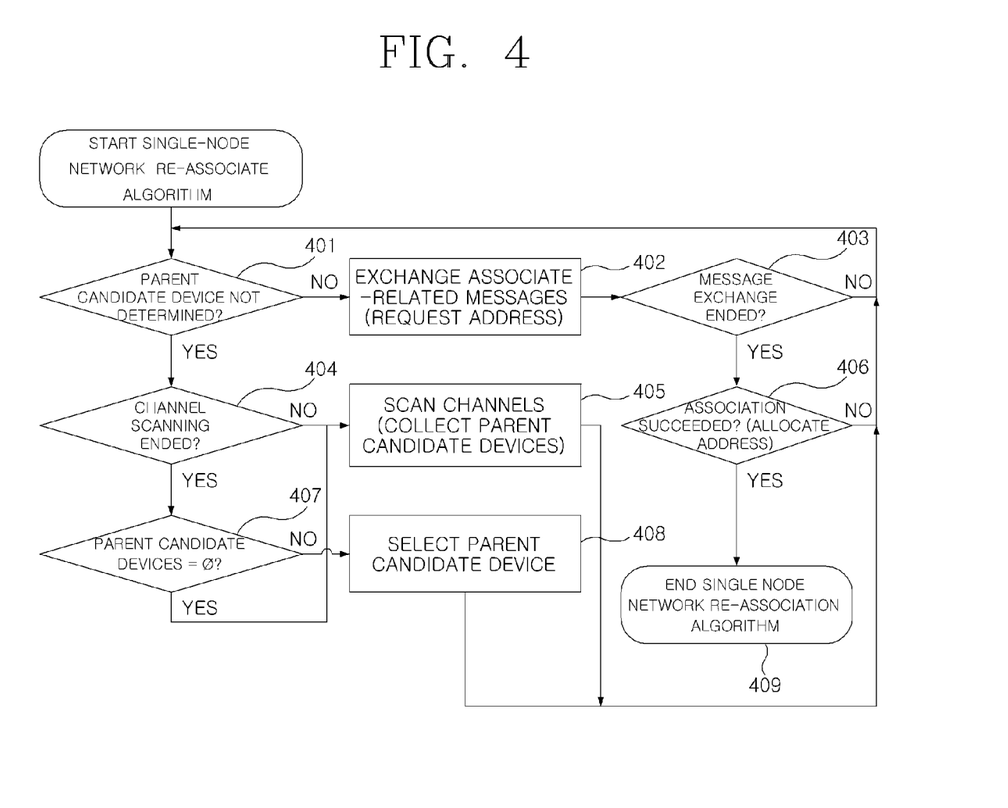
FIG. 4 illustrates a principle of single-node network re-association processes according to an embodiment of the present invention.

A single-node network re-association process performed when a device having no child device becomes an orphan device in operation 311 of FIG. 3, according to an embodiment of the present invention, is shown in FIG. 4. When a parent candidate device is not determined in operation 401, the orphan device determines whether to continue a channel scanning in operations 404 and 405. After the orphan device performs the channel scanning and determines a set of parent candidate devices in operation 407, the orphan device selects a parent candidate device as a device having the lowest network depth and providing the highest received signal power in the set of parent candidate devices for network re-association in operation 408. When the orphan device selects a parent candidate device in operation 401, the orphan device transmits an association request message to the selected parent candidate device to request for an address, and receives an association response message from the selected parent candidate device in operations 402 and 403. When the orphan device receives an association response message including an 'association permission' information, the orphan device gets a new address included in the association response message in operation 406 and finishes its single-node network re-association process in operation 409. When the orphan device receives an association response message including an 'association denial' information, the orphan device repeats the above operations until the set of parent candidate devices becomes empty, and when the set of parent candidate devices is empty in operation 407, the orphan device performs the channel scanning to determine a new set of parent candidate devices in operation 405.

Figure 5:
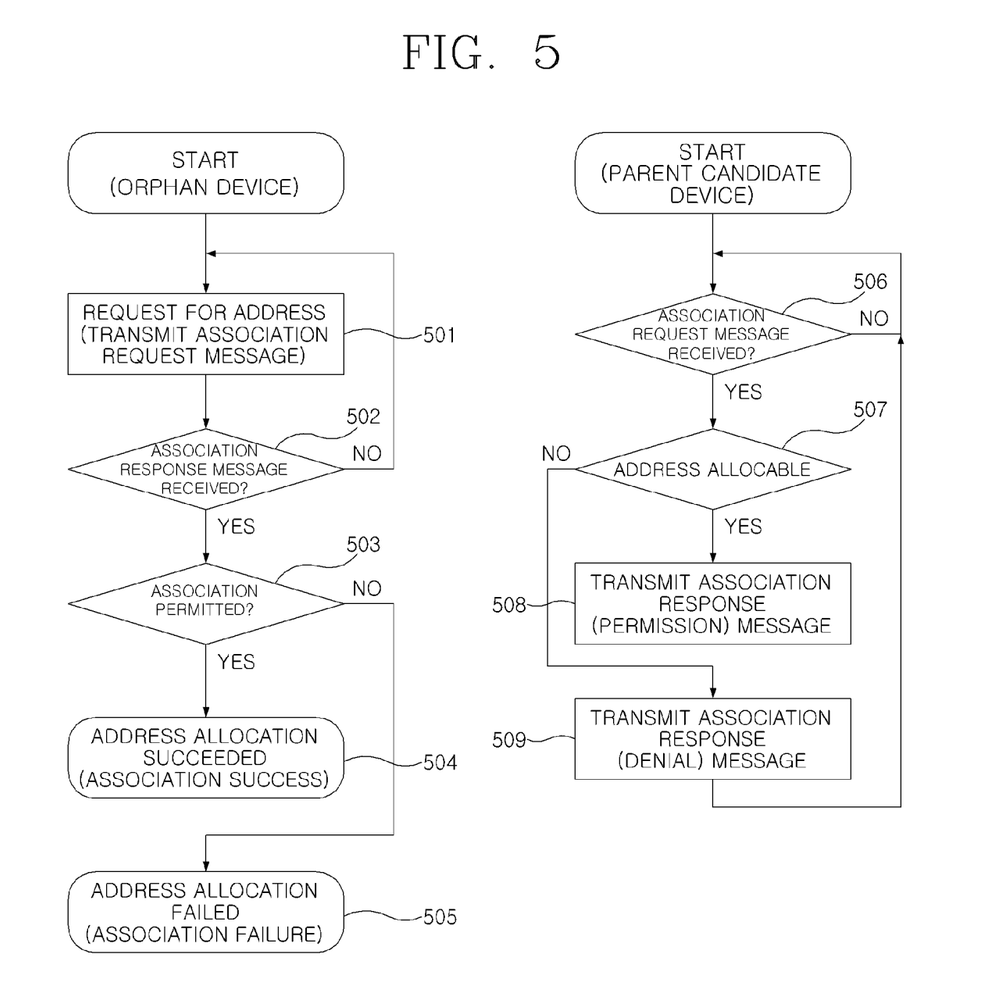
FIG. 5 illustrates a principle of address requesting and address allocation processes according to an embodiment of the present invention.

Procedures for address request of the orphan device and address allocation of the parent candidate device, which correspond to operations 304, 305, and 308 of FIG. 3 and operations 402, 403, and 406 of FIG. 4, according to an embodiment of the present invention, are shown in FIG. 5. The orphan device transmits an association request message to the selected parent candidate device to request for an address of itself or as a representative of its cluster, in operation 501. Upon receiving the association request message in operation 506, the selected parent candidate device determines whether it can allocate the orphan device an address space in its available address space in consideration of a type of the orphan device in operation 507. When it can allocate the orphan device an address space, it generates an association response message including an 'association permission' information in operation 508, and when it cannot allocate the orphan device an address space, it generates an association response message including an 'association denial' information in operation 509, and transmits the association response message to the orphan device. The orphan device checks whether an address space is allocated in operation 503 from a flag of the association response message received in operation 502. When a new address space is not allocated in operation 505, the orphan device removes the selected parent candidate device from the set of parent candidate devices, and performs operation 301 of FIG. 3 or operation 401 of FIG. 4. When a new address space is allocated in operation 504 after transmitting the association request message as a representative of its cluster, the orphan device transmits its beacon signal including its new address and network depth.

Figure 6:
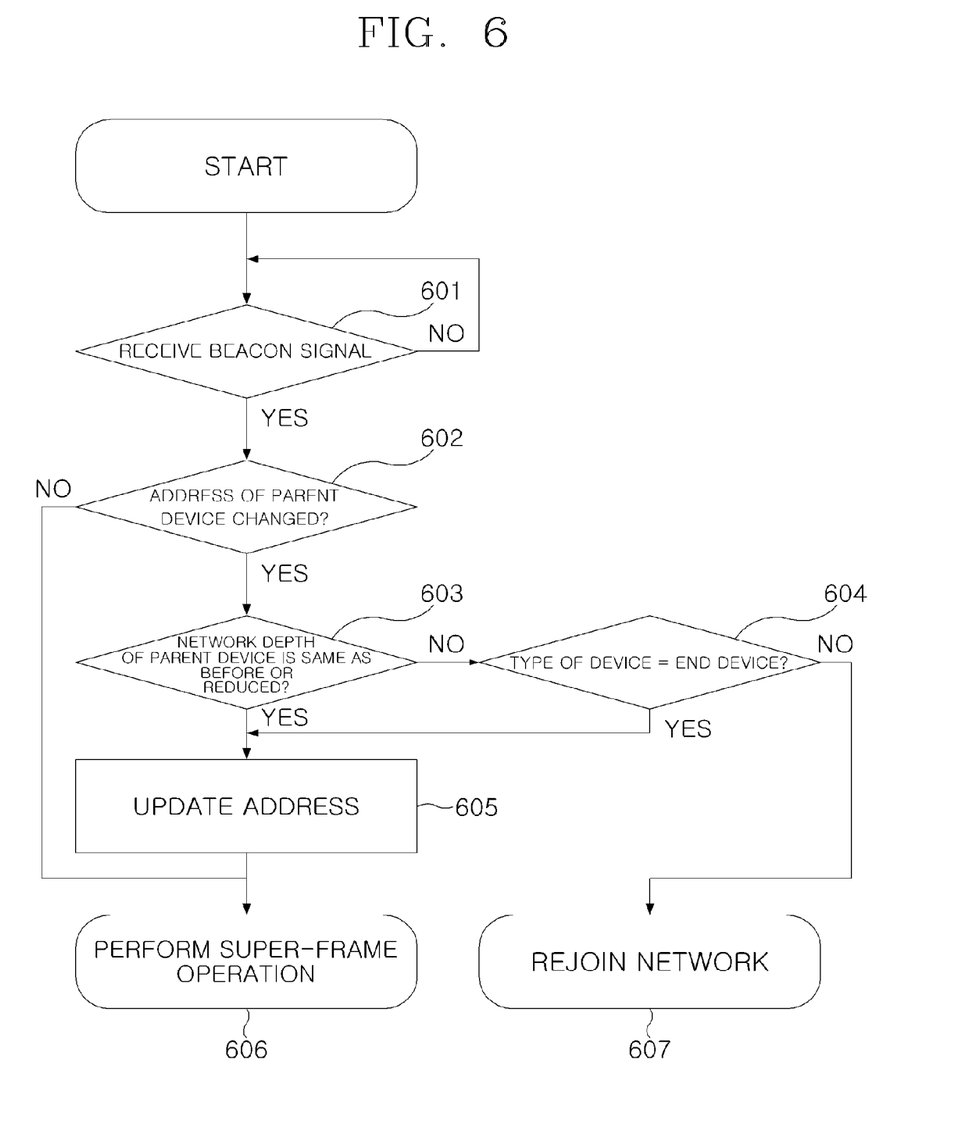
FIG. 6 illustrates a principle of address updating processes according to an embodiment of the present invention.

An address update procedure of a child device, according to an embodiment of the present invention, is shown in FIG. 6. A parent device re-associated to the network with a new address space transmits a beacon signal including its new address and network depth, and upon receiving the beacon signal in operation 601, a child device checks whether the address of its parent device in the received beacon signal has been changed in operation 602. Examples of a method of checking, by the child device, whether the beacon signal has been transmitted from its parent device, include a method of examining a unique identifier of its parent device included in the beacon signal and a method of examining the previous address of its parent device included in the beacon signal, which can be transmitted by the parent device. After the child device confirms that the address of its parent device has been changed in operation 602, the child device recognizes that its parent device has re-associated to the network, and tests whether the new network depth of its parent device is equal to or less than the previous network depth of its parent device in operation 603. After the child device confirms that the network depth is equal to or less than the previous network depth in operation 603, the child device updates its address in operation 605 regardless of its type (i.e., a router or an end device). Upon confirming that the new network depth of the parent device is larger than the previous network depth in operation 603, the child device updates its address in operation 605 only when the child device is an end device in operation 604. When the child device is a router, regardless of receiving a network re-association control message from its parent device in operation 312 of FIG. 3, the child device determines that the child device becomes an orphan device in operation 604, and may perform a cluster-wise network re-association procedure (FIG. 3) or a single-node network re-association procedure (FIG. 4) depending on whether the child device has its child devices or not.

Figure 7:
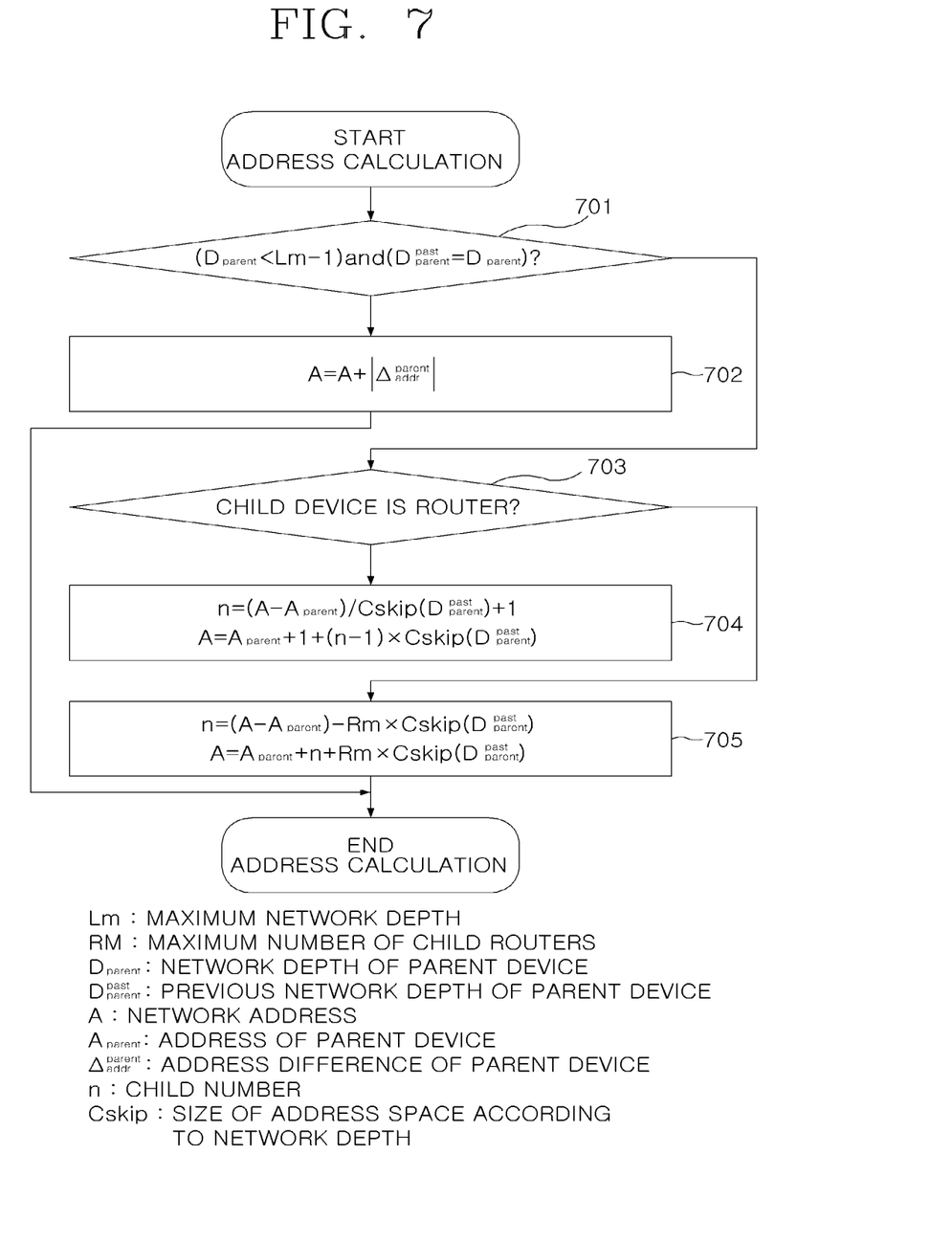
FIG. 7 illustrates a principle of address calculating processes according to an embodiment of the present invention.

A procedure for updating an address in operation 605 is shown in FIG. 7. As in operation 701, upon confirming that a network depth $D_{parent}$ of its parent device re-associating to the network is the same as the previous network depth $D_{parent}^{past}$ of its parent device and is less than a maximum network depth minus one (i.e., $L_m-1$), the child device may update its network address A by adding a difference $|\Delta_{addr}^{parent}|$ between the new and the previous address of its parent device to the network address A (i.e., $A=A+|\Delta_{addr}^{parent}|$). Also, upon confirming that the network depth $D_{parent}$ is larger than the previous network depth $D_{parent}^{past}$ in operation 701, when the child device is a router in operation 703, the child device updates its address by calculating a number n according to Equation 2 below in operation 704, where n denotes the n-th child device of its parent device.

$$n=(A-A_{parent})/C_{skip}(D_{parent}^{past})+1$$

$$A=A_{parent}+1+(n-1)\times C_{skip}(D_{parent}) \quad \text{[Equation 2]}$$

On the other hand, when the child device is an end device in operation 703, the child device updates its address by calculating the number n according to Equation 3 below in operation 705.

$$n=(A-A_{parent})-R_m\times C_{skip}(D_{parent}^{past})$$

$$A=A_{parent}+n+R_m\times C_{skip}(D_{parent}) \quad \text{[Equation 3]}$$

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

What is claimed is:

1. A network self-healing method in which a device dis-associated from a network due to a networking failure, referred to as an orphan device, re-associates to the network in a multi-hop cluster-tree structured wireless communication network, wherein a main communication device that manages network operation, routers that are devices capable of having their child devices, and end devices that are devices incapable of having their child devices are associated with each other in a parent-child device relationship, and child devices maintain synchronized operation with their parent device by receiving a beacon signal periodically transmitted from their parent device, the network self-healing method comprising:

when the orphan device is a router,
maintaining, by the orphan device, synchronized operation with its child devices by periodically transmitting a beacon signal as before being an orphan device, during a network re-association procedure;
determining, by the orphan device, a set of parent candidate devices and a parent candidate device in the set of parent candidate devices in consideration of network depth and received signal power; and
determining, by the orphan device, child devices that make network re-association together in consideration of network depth of the determined parent candidate device, and making, by the orphan device, network re-association to the determined parent candidate device with the determined child devices, and when the orphan device is an end device,
determining, by the orphan device, a set of parent candidate devices and a parent candidate device in the set of parent candidate devices in consideration of received signal power, and making, by the orphan device, network re-association to the determined parent candidate device.

2. The network self-healing method of claim 1, wherein the determining of a set of parent candidate devices and a parent candidate device in the set of parent candidate devices when the orphan device is a router comprises:
estimating, by the orphan device, network depth and power of received beacon signals after receiving beacon signals transmitted from adjacent devices by using a conventional channel scanning method;
determining, by the orphan device, a set of parent candidate devices for network re-association in consideration of network depth in an ascending order; and
determining, by the orphan device, a parent candidate device for network re-association as a device yielding the highest power of received beacon signal among devices having the lowest network depth in the determined set of parent candidate devices.

3. The network self-healing method of claim 1, wherein the determining of child devices that make network re-association together and making network re-association with the determined child devices when the orphan device is a router comprises:
when $L_{max}$ denotes a maximum network depth, $L_{past}$ denotes a network depth of the previous parent device of the orphan device, wherein $0\leq L_{past}<L_{max}$, and $L_{new}$ ($0\leq L_{new}<L_{max}$) denotes a network depth of the determined parent candidate device,
when $L_{new}=L_{max}-1$, transmitting, by the orphan device, a network re-association control message including a 're-association command' to all its child devices, and making, by the orphan device, the network re-association alone as an end device;
when $0\leq L_{new}<L_{max}-1$ and $L_{new}\leq L_{past}$, making, by the orphan device, the network re-association with the determined child devices while keeping a cluster-tree network structure with the determined child devices; and
when $0\leq L_{new}<L_{max}-1$ and $L_{new}>L_{past}$, transmitting, by the orphan device, a network re-association control message including a 're-association command' to its child routers, and making, by the orphan device, the network re-association only with its child end devices.

4. The network self-healing method of claim 3, wherein the making, by the orphan device, of network re-association with the determined child devices comprises:
   requesting, by the orphan device, the determined parent candidate device a network re-association as a child router;
   when the determined parent candidate device has an address space available for accepting the orphan device as its child router, allocating, by the determined parent candidate device, the available address space to the orphan device and accepting a request of network re-association of the orphan device as its child router, and when the determined parent candidate device has no address space available for accepting the orphan device as its child router, refusing, by the determined parent candidate device, a request of network re-association of the orphan device as a child router;
   when a request of network re-association of the orphan device is accepted by the determined parent candidate device, allocating, by the orphan device, each of its determined child devices an address by using the address space allocated by the determined parent candidate device, and when a request of network re-association of the orphan device is refused by the determined parent candidate device, removing, by the orphan device, the determined parent candidate device from the set of parent candidate devices, determining a new parent candidate device in the set of parent candidate devices, determining its child devices that make network re-association together, and making the network re-association with the determined child devices; and
   when a request of network re-association of the orphan device is refused by all parent candidate devices in the set of parent candidate devices, transmitting, by the orphan device, a re-association control message including a 're-association command' to all its child devices and making the network re-association alone by itself as an end device after determining of a set of parent candidate devices and a parent candidate device in the set of parent candidate devices.

5. The network self-healing method of claim 1, wherein the determining, by the orphan device, of a set of parent candidate devices and a parent candidate device in the set of parent candidate devices, and making network re-association when the orphan device is an end device comprises:
   estimating, by the orphan device, power of received beacon signal after receiving beacon signals transmitted from adjacent devices by using a conventional channel scanning method;
   determining, by the orphan device, a set of parent candidate devices for network re-association in consideration of received signal power in a descending order;
   determining, by the orphan device, a parent candidate device for network re-association as a device yielding the highest power of received beacon signal in the determined set of parent candidate devices;
   requesting, by the orphan device, the determined parent candidate device a network re-association as a child end device;
   when the determined parent candidate device has an address space available for accepting the orphan device as its child end device, allocating, by the determined parent candidate device, an address in the available address space to the orphan device and accepting a request of network re-association of the orphan device as its child end device, and when the determined parent candidate device has no address space available for accepting the orphan device as its child end device, refusing, by the determined parent candidate device, a request of network re-association of the orphan device as a child end device;
   when a request of network re-association of the orphan device is refused by the determined parent candidate device, removing, by the orphan device, the determined parent candidate device from the set of parent candidate devices, determining a new parent candidate device in the set of parent candidate devices, and making the network re-association as a child end device; and
   when a request of network re-association of the orphan device is refused by all parent candidate devices in the set of parent candidate devices, making, by the orphan device, the network re-association as an end device after determining of a set of parent candidate devices and a parent candidate device in the set of parent candidate devices.

6. The network self-healing method of claim 3, further comprising, when the orphan device transmits a network re-association control message to its child devices:
   when a child device that receives the network re-association control message is a router, while keeping network synchronization with its child devices, determining, by the child device, a set of parent candidate devices and a parent candidate device in the set of parent candidate devices, determining its child devices that make network re-association together, and making network re-association to the determined parent candidate device with the determined child devices as a child router; and
   when a child device that receives the network re-association control message is an end device, determining, by the child device, a set of parent candidate devices and a parent candidate device in the set of parent candidate devices, and making network re-association to the determined parent candidate device as a child end device.

7. The network self-healing method of claim 4, further comprising, when the orphan device transmits a network re-association control message to its child devices:
   when a child device that receives the network re-association control message is a router, while keeping network synchronization with its child devices, determining, by the child device, a set of parent candidate devices and a parent candidate device in the set of parent candidate devices, determining its child devices that make network re-association together, and making network re-association to the determined parent candidate device with the determined child devices as a child router; and
   when a child device that receives the network re-association control message is an end device, determining, by the child device, a set of parent candidate devices and a parent candidate device in the set of parent candidate devices, and making network re-association to the determined parent candidate device as a child end device.

* * * * *

UNITED STATES PATENT AND TRADEMARK OFFICE
CERTIFICATE OF CORRECTION

| | |
|---|---|
| PATENT NO. | : 10,004,105 B2 |
| APPLICATION NO. | : 15/384798 |
| DATED | : June 19, 2018 |
| INVENTOR(S) | : Yong Hwan Lee et al. |

Page 1 of 1

It is certified that error appears in the above-identified patent and that said Letters Patent is hereby corrected as shown below:

On the Title Page

After (65): Jun. 29, 2017, next line insert:
-- (30) Foreign Application Priority Data
Dec. 24, 2015 (KR).....................................................10-2015-0185989 --

Signed and Sealed this
Thirtieth Day of October, 2018

Andrei Iancu
*Director of the United States Patent and Trademark Office*